2,913,379

SEPARATION PROCESS

Morris A. Steinberg, University Heights, Ohio, assignor, by mesne assignments, to the United States of America as represented by the United States Atomic Energy Commission No Drawing. Application May 21, 1957
Serial No. 660,492

6 Claims. (Cl. 204—64)

This invention relates to the preparation of niobium. More particularly, it relates to the preparation of substantially pure niobium metal from raw materials containing oxides of niobium associated with oxides of tantalum.

The separation of niobium from tantalum has occupied the attention of investigators for many years. The classical method devised by deMarignac relies on the difference for solubilities of the complex fluorides of these elements. Other investigators have employed differential chlorination, selective reduction and the like for the desired separation.

I have now discovered still another method for effecting a clean separation of niobium from tantalum. In addition, the method I have devised is particularly advantageous because the niobium is ultimately recovered as a substantially pure metal. Preferably in accordance with my invention, a source material which includes a mixture of oxides of columbium and tantalum or materials which when subjected to strong heating decomposes to yield such oxides may be reduced with an appropriate amount of carbonaceous reducing agent to yield a mixture of niobium and either tantalum oxide or tantalum carbide or mixtures of tantalum oxide and tantalum carbide. Regardless of which of these products is formed, the niobium portion of the crude reaction mixture has been found to be susceptible to separation from the remainder of the constituents in the mixture by electrolysis.

Appropriate raw materials which are amenable to treatment by the method described herein include ores, concentrates, and even relatively pure oxides, carbonates, or other oxygen-containing compounds of niobium and may contain relatively large or only small amounts of tantalum compounds. The source material is preferably treated after it has been comminuted to a fairly fine particle size; minus 200 mesh (Tyler Standard) has been found to be suitable.

The crushed source material is intimately blended with a carbonaceous reducing agent which has been similarly comminuted. Lampblack, carbon black, crushed graphite, or crushed charcoal have all been found to be suitable in the reaction mixture.

In one embodiment of my invention, the carbon-oxide mixture is proportioned with sufficient reducing agent to reduce all of the niobium present to the metal and to convert any other oxides present to the corresponding carbides. In another embodiment, the amount of reducing agent may be merely sufficient to reduce the niobium compound to the metal, leaving the remaining oxides unaffected.

Once a suitably proportioned mixture has been prepared, it is charged into a furnace wherein it may be brought to a suitable reaction temperature. The furnace should be one which is connected to an actively pumping vacuum system whereby carbon monoxide and any other gaseous reaction products may be continuously removed from the vicinity of the reaction mixture. Such apparatus is well known and may comprise that for example described in my U.S. Patent 2,750,259. The mixture is maintained under diminished pressure and at an elevated temperature until the evolution of reaction products has substantially ceased. The furnace is then cooled and the crude metallic product formed therein is preferably crushed in preparation for the recovery therefrom of the metallic niobium.

The metallic niobium is separated from the remainder of the reaction product by making the crude reaction product the anode in a fused salt electrolysis process. In the process, the fused salt bath preferably consists of at least one alkali metal chloride salt. There should also be present in the fused electrolyte either a complex alkali metal-niobium-fluoride or a simple niobium halide. When a cathode is inserted into the fused bath and an electrolyzing current is passed between the cathode and the impure metallic anode material, the niobium deposits on the cathode as pure metal while the tantalum and other metal values in the crude reaction product have been found to remain as a sludge in contact with the crushed anode material. To minimize contamination of the freshly deposited niobium metal, it has been found advisable to employ a diaphragm insuring the physical separation of the fused salt bath into anolyte and catholyte regions. The electrolysis proceeds quite smoothly at temperatures between 800° C. and 1000° C. and at cathode current densities of between about 10 amps./dm.$^2$ and 200 amps./dm.$^2$ and at cell voltages of about 0.1–1.0 volt. The voltages and current densities (anode and cathode) are insufficient to cause the evolution of any visible gaseous anode products.

The following example will serve to more fully illustrate the manner in which niobium is separated from raw materials containing both niobium and tantalum in accordance with the present invention.

*Example*

A mix containing 95% $Nb_2O_5$ by weight and 5% $Ta_2O_5$ by weight was made up by blending 1504.1 grams $Nb_2O_5$ with 87.3 grams $Ta_2O_5$. To the mixture was added 324 grams of pure carbon powder with enough methylcellulose to form the mixture into a plastic mass. The amount of carbon was proportioned so as to provide a very slight excess over that required to reduce all of the $Nb_2O_5$ to Nb metal. The thoroughly mixed ingredients were then pressed into 1" diameter pellets and charged into a graphite crucible.

The charge was fired in an induction heated vacuum furnace and heated to 1970° C. until completion of the reaction. The charge was maintained at temperatures between 1000° C. and 1970° C. for a total of about 8 hours. After the reaction was complete the furnace was permitted to cool. The metallic sintered ingot was removed from the furnace after it had cooled to below 150° C. and was then crushed to about 4–8 mesh size.

Nineteen hundred (1900) grams of a mixture of 20%, by weight, $K_2NbF_7$ and 80% NaCl was melted in a nickel crucible under an inert atmosphere. The crucible also served as the electrolytic cell. Nine hundred and twenty (920) grams of the induction furnace product was charged into the melt. A series of 9 electrolyses was conducted at temperatures between 840° C. and 910° C., cathode current densities of 25–85 amp./dm.$^2$ and voltages of 0.35–0.50 volt.

The electrolyses were carried out using a nickel cathode. The nickel crucible was made anodic and served as the contact to the Nb—Ta anode material which settled to the cell bottom. The nickel is not transferred to the cathode since it is more noble than the Nb. The residual sludge containing oxides of tantalum and niobium as well as some carbides also collected on the cell bottom. An average of 20–25 grams of pure Nb metal were produced per deposit. On the average, about 0.4–0.6 gram of niobium were produced per amp. hr. passed, although under optimum conditions, up to 0.8 gram Nb/amp. hr. were obtained.

The cathode deposits were scraped from the nickel cathode, and then crushed and washed in appropriate aqueous buffered solutions. Although the crude anode material initially contained 3.1% Ta, analysis showed the products to contain less than 0.1% Ta and only nominal amounts of carbon, nitrogen and oxygen. The metal was readily consolidated by arc melting and could be worked into sheets and fabricated.

It will be seen that by maintaining the reducing conditions such that only the niobium is reduced to metal and thereafter conducting the electrolysis step under conditions of voltage and current density as indicated above, a method has been devised for separating niobium from tantalum and for recovering the niobium in useful form, as substantially pure metal.

I claim:

1. A method of separating niobium from tantalum associated therewith in source material in which said elements are present as oxygen-containing compounds which comprises: crushing said source material, blending said crushed source material with a carbonaceous reducing agent to form a mixture in which the amount of carbonaceous reducing agent is at least sufficient to reduce the niobium compounds in the source material to niobium metal, heating said mixture to reduce the niobium compounds to niobium metal, permitting the mixture to cool, recovering the cooled reaction product, charging the recovered product into an electrolytic cell containing a fused salt electrolyte wherein said recovered product is in electrical contact with an anode, passing an electrolyzing current through said cell thereby separating the niobium which is recovered as a substantially pure metal deposited at the cathode.

2. A method of separating niobium from tantalum associated therewith in source material in which said elements are present as oxygen-containing compounds which comprises: crushing said source material, blending said crushed source material with a carbonaceous reducing agent to form a mixture in which the proportion of carbonaceous reducing agent is at least sufficient to reduce the niobium compounds in the source material to niobium metal; heating said mixture to a temperature sufficient to reduce the niobium compounds to niobium metal, removing the carbon monoxide produced by said reaction, permitting the mixture to cool, recovering the cooled reaction product, charging the recovered product into an electrolytic cell containing an anhydrous fused salt electrolyte consisting of at least one alkaline metal chloride salt and a niobium halide wherein said recovered product is in electrical contact with an anode, passing electrolyzing current through said cell and separating and recovering the niobium as a substantially pure metal deposited at the cathode, while the tantalum remains in a sludge in the region of the anode.

3. A method of separating niobium from tantalum associated therewith in source material in which said elements are present as oxygen-containing compounds which comprises: crushing said source material, blending said crushed source material with a carbonaceous reducing agent to form a mixture in which the proportion of carbonaceous reducing agent is at least sufficient to reduce the nibium compounds in the source material to niobium metal, maintaining said mixture at a temperature between 1000° C. and 2000° C. for a time sufficient to reduce the niobium compounds to niobium metal, permitting the mixture to cool, recovering the cooled reaction product, charging the recovered product into an electrolytic cell containing an anhydrous fused salt electrolyte consisting of at least one alkaline metal chloride salt and a niobium halide wherein said recovered product is in electrical contact with an anode, passing an electrolyzing current through said cell and recovering the niobium as a substantially pure metal deposited at the cathode.

4. A method of separating niobium from tantalum associated therewith in source material in which said elements are present as oxygen-containing compounds which comprises: heating a mixture of a carbonaceous reducing agent and said oxygen-containing compounds in which the relative proportions are such as to provide an amount of carbonaceous reducing agent sufficient only to reduce the niobium compounds to niobium metal, removing the carbon monoxide produced by said heating, permitting the mixture to cool, recovering the cooled reaction product, charging the recovered product into an electrolytic cell containing an anhydrous fused salt electrolyte consisting of at least one alkaline metal chloride and a complex alkali metal-niobium fluoride salt is in electrical contact with an anode, passing an electrolyzing current through said cell and recovering the niobium as a substantially pure metal deposited at the cathode.

5. A method of separating niobium from tantalum associated therewith in source material in which said elements are present as oxygen-containing compounds which comprises: heating a mixture of a carbonaceous reducing agent and said oxygen-containing compounds to a temperature sufficient to reduce the niobium compounds to niobium metal, permitting the mixture to cool, recovering the cooled reaction product, providing an electrolytic cell containing a fused salt electrolyte, charging the recovered product into the electrolytic cell so that it is in electrical contact with an anode, passing an electrolyzing current through said cell and recovering the niobium as a substantially pure metal deposited at the cathode.

6. The process of claim 5 in which the electrolyte consists essentially of at least one niobium halide and at least one alkali metal chloride and the electrolysis is conducted at a temperature between 800° C. and 1000° C. and at cathode current densities between 10 amperes per square decimeter and 200 amperes per square decimeter.

References Cited in the file of this patent

UNITED STATES PATENTS

| | | |
|---|---|---|
| 947,983 | Weintraub | Feb. 1, 1910 |
| 2,598,833 | Renman | June 3, 1952 |

FOREIGN PATENTS

| | | |
|---|---|---|
| 635,267 | Great Britain | Apr. 5, 1950 |
| 1,104,036 | France | Nov. 15, 1955 |
| 1,105,530 | France | Dec. 5, 1955 |

OTHER REFERENCES

Metal Industry, June 29, 1945, page 407.